United States Patent [19]

Bowen

[11] Patent Number: 5,033,877
[45] Date of Patent: Jul. 23, 1991

[54] HOLLOW ROLLER BEARING PRELOADED BY AN INTERFERENCE FIT

[75] Inventor: Willard L. Bowen, Harwinton, Conn.
[73] Assignee: ZRB Bearings, Inc., Harwinton, Conn.
[21] Appl. No.: 625,883
[22] Filed: Dec. 11, 1990
[51] Int. Cl.[5] .................. F16C 33/34; F16C 43/04
[52] U.S. Cl. ...................................... 384/567; 384/584
[58] Field of Search ............... 384/566, 567, 559, 491, 384/584, 585, 510, 537; 29/525, 724, 898.062, 898.07

[56] References Cited

U.S. PATENT DOCUMENTS

| | | | |
|---|---|---|---|
| 1,498,674 | 6/1924 | Runge | 29/724 |
| 2,251,714 | 8/1941 | Onions | 384/566 |
| 2,943,894 | 7/1960 | Brook | 29/148.4 A |
| 3,036,365 | 5/1962 | Hanau | 29/148.4 A |
| 3,337,278 | 8/1967 | Vigh | 384/566 |
| 3,410,618 | 11/1968 | Harris et al. | 384/567 |
| 3,765,071 | 10/1973 | Bowen | 29/148.4 A |
| 3,797,900 | 3/1974 | Secola | 384/537 |
| 3,930,693 | 1/1976 | Bowen | 384/567 |
| 4,002,380 | 1/1977 | Bowen | 384/567 |
| 4,232,914 | 11/1980 | Bowen, III | 384/567 |

FOREIGN PATENT DOCUMENTS 0946559 6/1949 France .................... 384/567

*Primary Examiner*—Thomas R. Hannon
*Attorney, Agent, or Firm*—McCormick, Paulding & Huber

[57] ABSTRACT

A hollow roller bearing has inner and outer races with the former provided with opposing axially spaced generally radially outwardly projecting shoulders. Roller bearings, hollow by diameter in the range 55% to 75% are disposed between the shoulders and in loose engagement with the inner and outer races during initial assembly. The bearings are thereafter pressed onto a shaft for preloading and assembly is thus completed. A method for making bearings involves the provision of the bearing as described with a loose assembly of the elements. The mounting method involves the press fitting of the loosely assembled elements on a shaft where upon preloading is achieved.

7 Claims, 2 Drawing Sheets

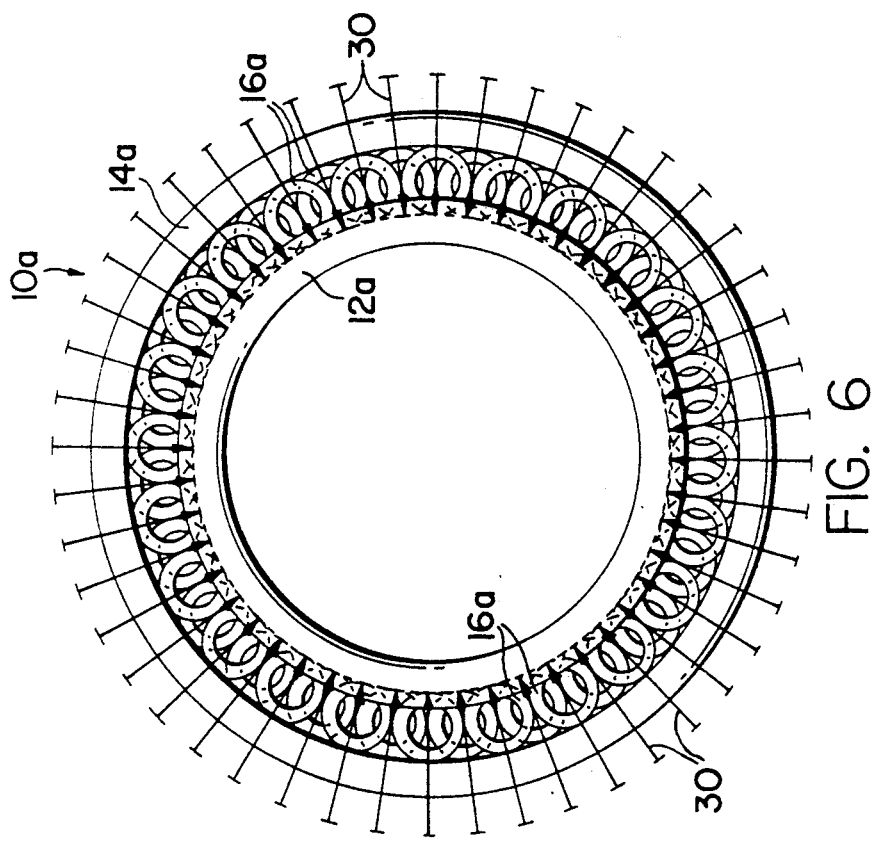
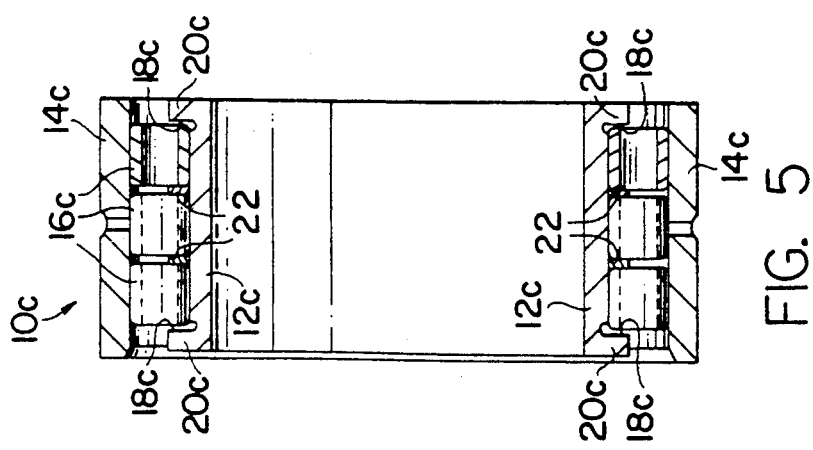

HOLLOW ROLLER BEARING PRELOADED BY AN INTERFERENCE FIT

BACKGROUND OF THE INVENTION

Hollow roller bearings have heretofore been used successfully but in a limited number of applications. The following U.S. Patents are at least partially indicative of the state of the art in this area.

|   | Title | Inventor |
|---|---|---|
| 3,765,071 | Method of Forming a Roller Bearing of Superior Runout Characteristics | Willard L. Bowen |
| 3,930,693 | Full Complement Bearing Having Preloaded Hollow Rollers | Willard L. Bowen |
| 4,002,380 | Roller Bearing of Superior Run-Out Characteristics | Willard L. Bowen |
| 4,232,914 | Hollow Roller Tapered Bearing | Willard L. Bowen |

These patents are at least indicative of the history of development of hollow roller bearings and set forth to several advantages associated therewith. The hollow roller bearings disclosed by the patents, however, are subject to a serious disadvantage in use. The customer must initially press the inner race onto the shaft or the like, grind the race to the proper diameter for an interference fit, and thereafter the shaft with the inner race thereon is assembled within the rollers and the flanged outer race to provide a desired preload. This method of assembly is of course quite time consuming and cumbersome with the bearings being shipped to the customer in separate parts.

It is the general object of the present invention to provide an improved hollow roller bearing and method of making and mounting the same wherein the bearings may be shipped and efficiently mounted on a shaft or the like as an assembled unit.

SUMMARY OF THE INVENTION

In fulfillment of the foregoing object, hollow roller bearings are manufactured with inner and outer races and at least the former has opposing axially spaced generally radially outwardly projecting shoulders. A plurality of hollow roller bearings are provided with the bearings arranged in an annular series circumaxially about the inner race and within the outer race. The bearings are hollow throughout their length and are hollow by diameter in the range 55% to 75%. On assembly within the races, a slight internal radial clearance is provided for and the bearing is thereafter preloaded as required in the course of mounting the same on a shaft or the like. An interference fit between the inner bearing race and the shaft or the like serves to radially preload the bearings as required for highly efficient and accurate operation as set forth in the foregoing patents.

Preferably, at least two axially adjacent annular series of hollow roller bearings are provided in assembled relationship of the bearings and three or more such annular series of axially adjacent hollow roller bearings may be provided within the contemplation of the invention.

The outer bearing race may be provided with a constant internal diameter throughout its length or may have one or more annular shoulders or other features.

The inner bearing race may have a constant internal diameter or, a tapered bearing may be provided in accordance with the invention, wherein the inner bearing race is of course provided with a frusto-conical internal surface.

The extent or degree of preload is such that the elastic limit of the material of the races is not exceeded and may be on the order of .001 of an inch and may even exceed .001 of an inch with the hollow bearings of the present invention.

DESCRIPTION OF THE DRAWINGS

FIG. 5 is a vertical sectional view similar to FIGS. 2 through 4 but illustrates a hollow roller bearing construction wherein three (3) axially adjacent annular series of roller bearings are provided.

FIG. 6 is an end view of the bearing of FIG. 3 taken as indicated at 6, 6.

DESCRIPTION OF PREFERRED EMBODIMENTS

Figure 1:
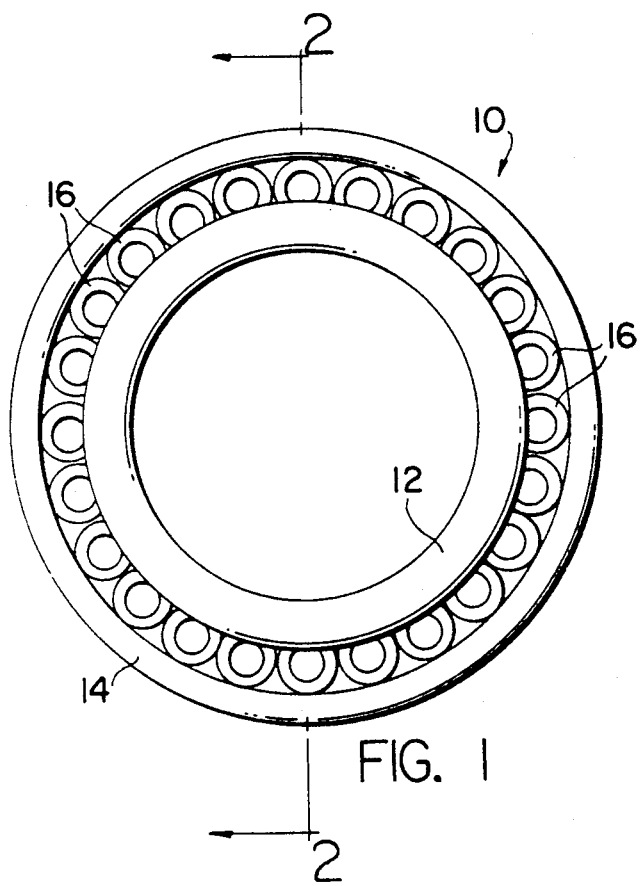
FIG. 1 of the drawings is an end view of an improved hollow roller bearing constructed in accordance with the present invention.
Figure 2:
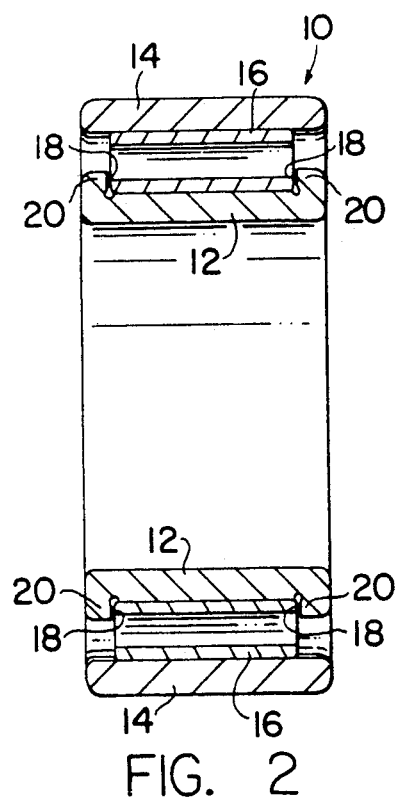
FIG. 2 is a vertical sectional view taken generally as indicated by the line 2, 2 in FIG. 1.

Referring to particularly to FIGS. 1 and 2, it will be observed that an improved hollow roller bearing constructed in accordance with the present invention is indicated generally at 10 and comprises inner and outer races 12, 14, and a plurality of hollow roller bearings indicated at 16, 16. As best illustrated in FIG. 2 the inner race 12 has opposing generally radially outwardly projecting shoulders 18, 18 which serve to restrain the roller bearings 16, 16 against axial movement. The shoulders 18, 18 are formed by similar radially outwardly projecting annular end flanges 20, 20.

As will be observed, the roller bearings 16, 16 are hollow throughout their length and they may also exhibit other characteristics as set forth in the foregoing patents. More particularly, the hollow roller bearings 16, 16 are preferably hollow by diameter in the range 55% to 75%.

It is an important feature of the present invention that the hollow roller bearings 16, 16 are preloaded when the bearings are in fully assembled condition on a shaft or the like and ready for use. Further description in this regard may be found in the foregoing patents. Preferably, the preload of the hollow bearings is on the order of 0.001 of an inch and may even be in excess of 0.001 of an inch. The elastic limit of the material of the races is in no event exceeded and all rollers are preloaded equally.

Despite the necessary preloaded condition of the bearings in their operational mode, it is important to note that, in accordance with the present invention, the hollow roller bearings are not preloaded in their initial assembled condition. That is, the hollow rollers 16, 16 are disposed in the bearing between the inner and outer races 12 and 14 in a relatively loose arrangement. With a small radial clearance in the bearing, the outer race can be readily assembled about the rollers after they have been disposed between the shoulders of the inner race. The clearance may vary in accordance with the invention but is preferably in the range of 0.0001" to 0.001".

Prior to entering their operational mode, the assembled bearings of the present invention are pressed onto a shaft or the like with a slight interference or press fit. This causes preloading of the bearings due to the resulting expansion of the inner race and it should be noted at this point that the extent or degree of preload is not critical except for the aforementioned elastic limit limitation. Considerable flexibility is afforded by the hollow rollers without any resulting overstressing of bearing parts. Hollow roller bearings of the invention are able to withstand an appreciable preload in excess of 0.001 inches without detriment to running surfaces of the races or rollers.

The foregoing is of course not true with regard to solid roller bearings. When a solid roller bearing is pressed on to a shaft in order to obtain a preload, it is an extremely difficult matter to properly preload the bearing without over-stressing the bearing elements. The permissible preload with solid roller bearings is on the order of 0.0001 inches to 0.0002 inches. Preloads in excess of these limits tend to cause high contact stresses on running surfaces and may result in spalling and premature failure.

It should also be noted that the loose assembly of the bearing elements in accordance with the present invention results in improved shelf life of the bearings. The internal radial clearance allows a film of oil to coat the bearing race and roller surfaces. If, on the other hand, the bearing were first preloaded and then stored, contact corrosion might occur where the preloaded rollers and roller races are held in tight engagement. Such continuing contact pressure squeezes out the lubricant between the rollers and the raceways resulting in metal-to-metal contact. This in turn results in fretting corrosion and/or pitting of the roller and raceway surfaces.

Figure 3:
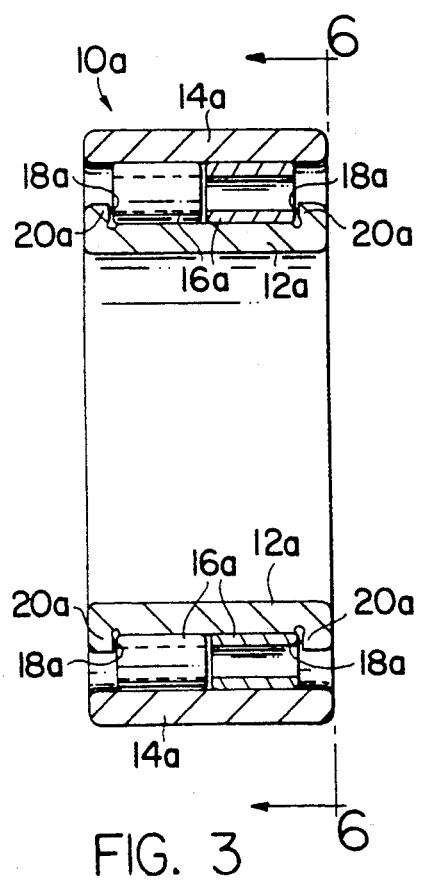
FIG. 3 is a vertical sectional view through a hollow roller bearing similar to that shown in FIG. 2 but having two (2) axially adjacent annular series of roller bearings.

In FIG. 3, a bearing constructed in accordance with the present invention is indicated generally at 10a and includes inner and outer races 12a and 14a. Hollow roller bearings 16a, 16a disposed between the inner and outer races are arranged in two axially adjacent annular series. The bearing may otherwise be regarded as substantially identical with the bearing 10 of FIGS. 1 and 2.

The bearing of FIG. 3 is provided with a small radial clearance during initial assembly as in the case of the bearing 10 and is provided with shoulders 18a, 18a on its inner race 12a formed by flanges of 20a, 20a as in the case of the bearing 10. Thus, the bearing 10a may be assembled with the bearings loosely retained in position and thereafter pressed onto a shaft or the like to preload the rollers 16a, 16a. All of the advantages set forth above are exhibited by the bearing 10a.

In addition to the foregoing, the multiple annular series of rollers improves the runout accuracy of the bearing. The greater number of preloaded rollers provides for a greater number of centering forces as illustrated by arrows 30, 30 in FIG. 6 with the rollers in circumaxially staggered relationship. This arrangement also serves to maintain a more constant center of rotation. The radial accuracy and stiffness of the bearing is thus substantially enhanced.

It should also be noted that hollow rollers of limited axial dimension as in the bearing 10a are much easier to manufacture. The drilling of a short hole is much more readily accomplished than in the case of the relatively long central bore in the rollers 16, 16 of FIG. 1. Further, roller size and shape is more readily maintained at low tolerances in shorter rollers.

The increased accuracy of a bearing with multiple series of hollow rollers will also be evident. Raceway variations in one annular series of rollers will have no effect on the rollers in an adjacent series. The preloading results in a sharing of the load by all of the rollers and the greater number of rollers provides less variation which might otherwise affect the radial runout of the bearing.

Finally, the multiple annular series of rollers can readily accommodate the construction of extremely wide bearings to carry large loads. As many as four series of rollers have been employed successfully and it is contemplated that even more annular series of rollers could be employed due to the fact that preloading allows all rollers to share the load.

Figure 4:
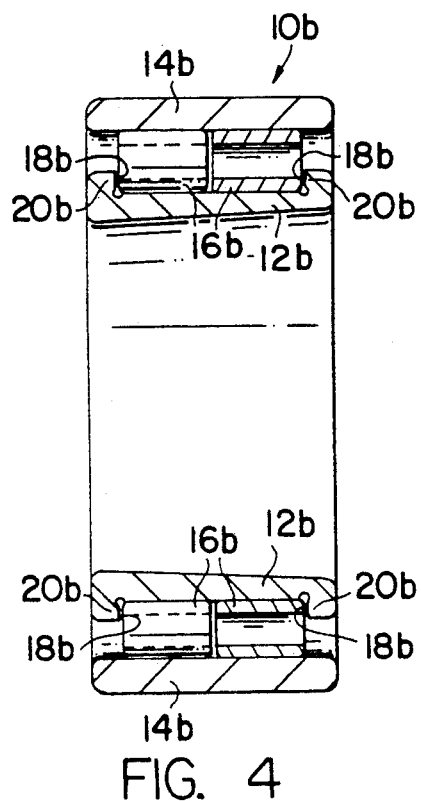
FIG. 4 is a vertical sectional view similar to FIG. 3 but showing a tapered hollow roller bearing design.

In FIG. 4 a bearing 10b is identical in all respects with the bearing 10a of FIG. 3 except for the provision of a conventional tapered bearing configuration. That is, the inner diameter of the inner race 12a in FIG. 3 is constant as illustrated whereas the inner diameter of the inner race 12b in FIG. 4 is frusto-conical to provide a conventional tapered bearing design. Both the method of manufacturing and assembling the bearing as well as the mounting method described above are fully applicable to the FIG. 4 bearing.

In FIG. 5 a bearing 10c is provided with three (3) axially adjacent annular series of hollow roller bearings 16c, 16c. The bearing is otherwise substantially identical with the bearings described above except for the provision of spacers 22, 22 between the centrally located series of roller bearings and each end series of bearings. It has been found that the bearing of FIG. 5 can be provided with or without the spacers 22, 22. Substantially identical results in terms of efficiency and accuracy are achieved in operation in either event.

The methods of making and mounting the bearings of the present invention will be apparent from the foregoing. As suggested, a first step in the method of making a roller bearing in accordance with the present invention resides in the manufacture of inner and outer roller bearing races with at least the inner race having opposing axially spaced generally radially outwardly projecting shoulders. A plurality of roller bearings are provided and are hollow throughout their length and hollow by diameter in the range 55% to 75%. Initial assembly of the bearing requires that the races and the rollers be assembled without a preload and instead with a slight internal radial clearance.

The method of mounting the bearings of the present invention includes the foregoing steps and the additional step of assembling a bearing on a shaft or the like with a slight interference fit whereby to radially preload the bearing. As stated, significant tolerance is permissible in preloading and a highly efficient and accurate operation ensues.

As will be apparent from the foregoing a seemingly minor advance in the aforesaid methods and bearing design results in very substantial practical improvements and in significant economic advantage. The grinding of inner bearing races is achieved with substantial facility and is much more readily accomplished than the grinding of channel type outer races. The bearings may be readily assembled in loose engagement at the manufacturing plant and thereafter preloaded by the customer during mounting of the same on a shaft, spindle etc. A simple and expedient procedure is provided and yet results in a high degree of efficiency and accuracy inherent with hollow roller bearings. A number of other secondary advantages and features are also realized as described above.

I claim:

1. A roller bearing comprising inner and outer roller bearing races at least one of which has opposing axially spaced generally radially projecting shoulders, and a plurality of roller bearings hollow throughout their length and hollow by diameter in the range 55% to 75%, said races and rollers being so dimensioned relatively as to be in an initial assembled relationship without preload and with a slight internal radial clearance, whereby the races and the rollers are assembled unitarily with a shaft, the shaft dimensioned to provide a slight interference fit with the inner race to take up said slight internal radial clearance and to preload the bearing, without exceeding the elastic limit of the inner bearing race.

2. A roller bearing as set forth in claim 1 wherein at least two axially adjacent annular series of hollow roller bearings are provided in assembled relationship with said races.

3. A roller bearing as set forth in claim 1 wherein at least three axially adjacent annular series of hollow roller bearings are provided in assembled relationship with said races.

4. A roller bearing as set forth in claim 1 wherein said opposing shoulders are formed by outwardly projecting annular flanges on the inner bearing race.

5. A roller bearing as set forth in claim 1 wherein said outer bearing race has a constant internal diameter throughout its length.

6. A roller bearing as set forth in claim 1 wherein said inner bearing race has a constant internal diameter throughout its length.

7. A roller bearing as set forth in claim 1 wherein said inner bearing race has a frusto-conical internal surface.

* * * * *